United States Patent [19]

Haerle et al.

[11] Patent Number: 5,240,485
[45] Date of Patent: Aug. 31, 1993

[54] EXHAUST GAS FILTER

[76] Inventors: Hans A. Haerle, Roettinger Strasse 38, D-7085 Bopfingen; Hans J. Langer, Neuffenweg 14, D-7148 Remseck 3, both of Fed. Rep. of Germany

[21] Appl. No.: 724,337

[22] Filed: Jul. 2, 1991

[30] Foreign Application Priority Data

Jul. 5, 1990 [DE] Fed. Rep. of Germany ....... 4021495

[51] Int. Cl.$^5$ ............................................. B01D 46/42
[52] U.S. Cl. ....................................... 55/309; 55/523; 55/DIG. 30; 60/311
[58] Field of Search .................... 55/309, 312–314, 55/523, DIG. 30; 60/311

[56] References Cited

U.S. PATENT DOCUMENTS

| | | | |
|---|---|---|---|
| 2,267,918 | 12/1941 | Hildabolt | 55/487 |
| 3,087,233 | 4/1963 | Turnbull | 55/523 |
| 3,161,478 | 12/1964 | Chessin | 29/191.2 |
| 3,306,353 | 2/1967 | Burne | 165/164 |
| 3,904,551 | 9/1975 | Lundsager et al. | 252/455 R |
| 4,062,807 | 12/1977 | Suzuki | 252/443 |
| 4,064,914 | 12/1977 | Grant | 138/142 |
| 4,301,012 | 11/1981 | Puckett | 210/457 |
| 4,329,162 | 5/1982 | Pitcher, Jr. | 55/523 |
| 4,462,208 | 7/1984 | Hicks et al. | 60/311 |
| 4,515,758 | 5/1985 | Domesle et al. | 423/213.2 |
| 4,558,565 | 12/1985 | Kojima et al. | 55/282 |
| 4,652,286 | 3/1987 | Kusuda et al. | 55/523 |
| 4,662,915 | 5/1987 | Shirai et al. | 55/511 |
| 4,687,579 | 8/1987 | Bergman | 210/347 |
| 4,725,411 | 2/1988 | Cornelison | 422/180 |
| 4,732,593 | 3/1988 | Kondo et al. | 55/523 |
| 4,758,272 | 7/1988 | Pierotti et al. | 75/246 |
| 4,760,047 | 7/1988 | Jeschke et al. | 502/439 |
| 4,858,431 | 8/1989 | Leonhard et al. | 55/DIG. 30 |
| 4,867,768 | 9/1989 | Wagner et al. | 55/523 |
| 4,875,336 | 10/1989 | Hayashi et al. | 55/314 |
| 4,889,630 | 12/1989 | Reinhardt et al. | 210/490 |
| 4,971,769 | 11/1990 | Haerle | 422/171 |
| 4,981,172 | 1/1991 | Haerle | 165/133 |
| 5,009,857 | 4/1991 | Haerle | 422/180 |

FOREIGN PATENT DOCUMENTS

| | | |
|---|---|---|
| 42301 | 12/1981 | European Pat. Off. |
| 3937809 | 7/1990 | Fed. Rep. of Germany |
| 3901609 | 5/1991 | Fed. Rep. of Germany |
| 1453653 | 8/1966 | France |
| 2462188 | 2/1981 | France |
| 54-128842 | 5/1979 | Japan |
| 54-152241 | 11/1979 | Japan |
| 61-287451 | 12/1986 | Japan |
| 62-225221 | 10/1987 | Japan |

*Primary Examiner*—Bernard Nozick

[57] ABSTRACT

An exhaust gas filter, such as a soot filter for a diesel engine, is provided with a filter body disposed in a housing. The exhaust gases flow through the filter body to be cleaned. The filter also has an inlet duct and an outlet duct. Between the inlet duct and the outlet duct, there is disposed one or several lateral lines for passing gases along the outside of the filter body. Both ends of the lateral lines are connected via apertures to the inlet duct and the outlet duct, respectively. The cross sections of the inlet duct, outlet duct and the lateral lines are selected so that in the unloaded condition of the filter body a return flow in the lateral lines is produced, while a bypass flow is produced when a preselected loading condition of the filter body is reached.

4 Claims, 1 Drawing Sheet

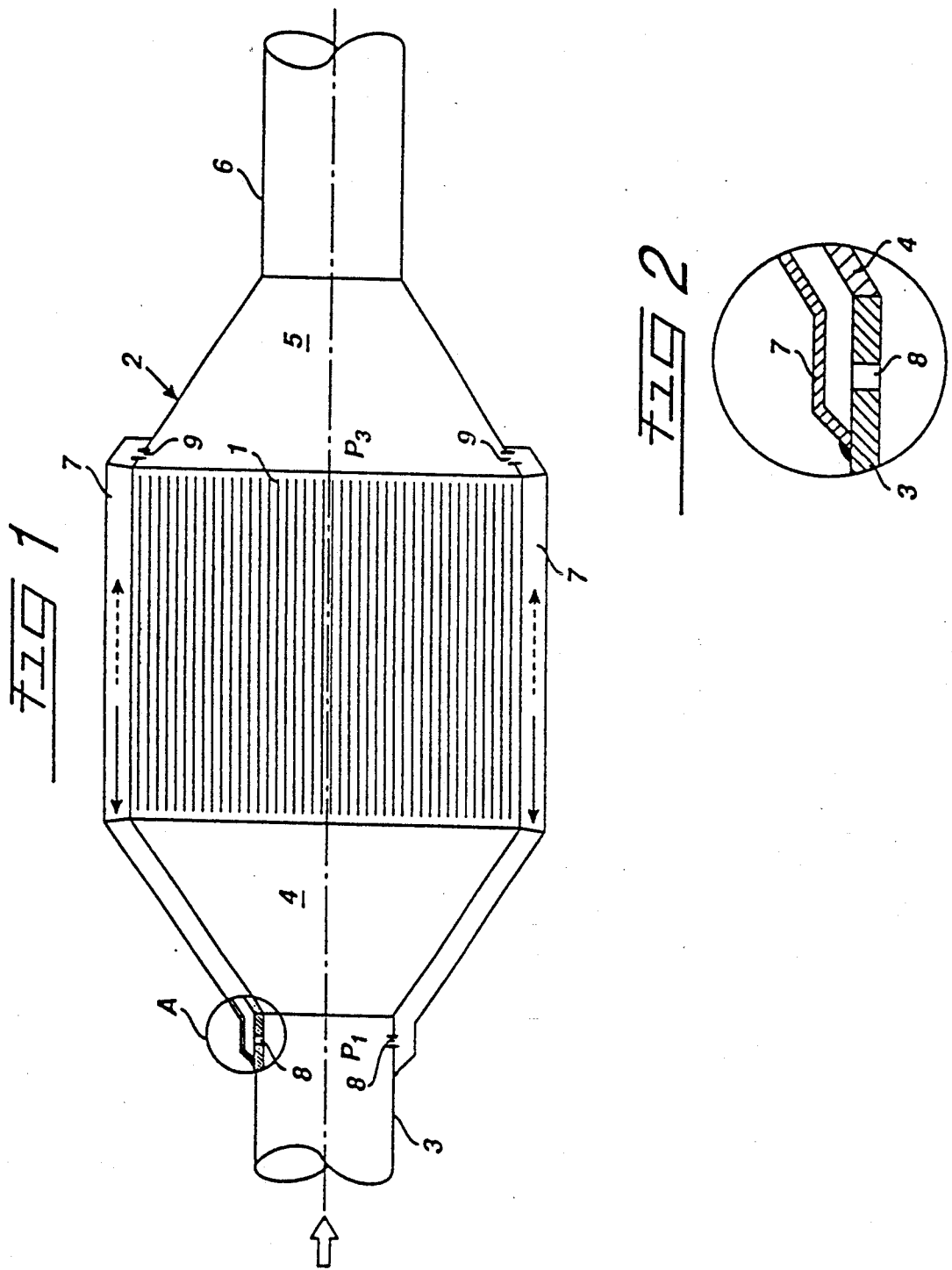

EXHAUST GAS FILTER

BACKGROUND OF THE INVENTION

The invention relates to an exhaust gas filter, and more especially, to a soot filter for a diesel engine, having a filter body disposed in a housing through which the exhaust gases pass to be cleaned, and having an inlet duct and an outlet duct.

An exhaust gas filter of this type is described in German Offenlegungsschrift 38 18 281, for example. Such a filter is particularly advantageously used for the removal of soot and substances similar to soot from an internal combustion engine, especially a diesel engine.

Further areas of application are combustion installations in private, industrial or in public premises.

A filter body consisting of one or more compression moulded sintered products having high temperature stability can be used with particular advantage as a filter body. Such a filter body possesses high efficiency with simultaneously high thermal conductivity, with even catalytic effects partly occurring. This is the case especially if the filter body is coated with catalytically effective materials, such as, for example, platinum, rhodium, vanadium and the like.

A disadvantage of the known exhaust gas filters is that the gas back pressure in the filter can vary greatly as a function of the filter loading. Therefore, corresponding fluctuations in efficiency also result, in particular, in the filtration efficiency of impurities. Thus, for example, with an unloaded or only slightly loaded filter, i.e. with a new or cleaned filter, only a relatively small back pressure is sound, as a result of which the flow through the filter body is relatively fast. In contrast, if the filter is already heavily loaded, the gas back pressure is higher. This means that a correspondingly high resistance has to be overcome before there is a flow through the filter body, under which the engine rating, inter alia, suffers with the use of the exhaust gas filter in an internal combustion engine.

Therefore the object of the present invention is to create an exhaust gas filter of the type mentioned at the beginning, with which the above-mentioned disadvantages are avoided, and its efficiency in particular becomes more uniform and is improved.

SUMMARY OF THE INVENTION

This object is achieved as specified by the invention in that between the inlet duct and the outlet duct there are disposed one or several lateral lines passing the filter body, which at both their ends respectively are connected via apertures to the inlet duct and the outlet duct respectively, with the cross sections of the inlet duct, outlet duct and the lateral lines being selected so that in the unloaded condition of the filter body there is a return flow in the lateral lines, whereas a bypass flow is produced from a pre-selected loading condition.

The lateral lines according to the invention have an unexpected effect on the gas pressure in the filter and consequently on the flow velocity of the exhaust gases.

In the unloaded or slightly loaded condition of the filter body, i.e. if there is only a relatively slight resistance to the flow of the exhaust gases, at the outlet duct there is a gas pressure which is higher than the gas pressure in the region of the inlet duct, for example when the inlet duct is designed so that it becomes wider and an outlet duct is designed so that it tapers. As long as the velocity of the exhaust gases flowing in the inlet duct in the region of the inlet apertures into the lateral lines is higher and thus the pressure at this point is lower than the delivery velocity of the cleaned exhaust gases in the region of the apertures into the lateral lines in the outlet duct and consequently the pressure there is also correspondingly higher, in the lateral lines a return flow is produced towards the inlet side of the exhaust gas filter. This means that a part of the exhaust gas is again returned from the outlet duct to the inlet duct.

The exhaust gases flowing back through the lateral lines ensure an equalisation of the entire flow of exhaust gas. A further advantage lies in that, if necessary, a part of the cleaned exhaust gas can be cleaned again by being conveyed again through the filter body.

As the loading of the filter body increases, the flow velocities, and thus, also the differences in pressure in the said regions between the inlet duct and the outlet duct become less, and after a certain loading condition has been reached, there occurs no return flow via the lateral lines. If the loading condition of the filter body increases further, then a part of the exhaust gas passes through the lateral lines without being filtered and thus reduces the separation efficiency. This condition is reached when, as a result of the greater resistance in the filter body, the pressure in front of the filter body is greater than the pressure in the outlet duct in the region of the apertures in the lateral lines.

Therefore, the gas pressure in front of the filter and thus the separation efficiency and the direction of flow through the lateral lines can be accordingly selected by the appropriate choice of the cross sections of the ducts and lateral lines.

Of course, in general, care will be taken so that, even if unfiltered exhaust gases do pass through the lateral lines, the filtration efficiency is still great enough for the required laws and regulations on exhaust gases to be observed.

By avoiding too great gas pressures in front of the filter in the heavily loaded condition of the filter, negative effects on the engine rating are also avoided.

Another very surprising result was produced by the design specified by the invention with lateral lines, namely that the thermal properties of the exhaust gas filter were thereby improved. Thus greater heat is produced in the filter body and there is a more uniform distribution of heat.

In practice, a type of thermal jacket for the filter body is created by the exhaust gases which flow through the lateral lines. This is the case, in particular, if the lateral lines are disposed around the filter body and are located between the filter body and the housing surrounding it, for example.

Experiments have shown that in this way the conversion temperature, i.e. the temperature at which soot combustion and soot conversion respectively occurs, falls from 380° to approximately 320° C. because of the simultaneous reduction in gas velocity and better distribution of temperature.

The advantageous effect is increased still further by a suitable arrangement of the lateral lines around the filter body.

Thus, for example, the lateral line may be constructed as a circular or annular line between the filter body and the housing surrounding it.

Very varied materials could be used for the filter body. A very advantageous combination of the design for a gas filter with lateral lines specified by the invention comprises a filter body which is formed from a woven cloth, braiding or knitted fabric of metallic fibres sintered to one another and/or powdered metal, with a plurality of inlet ducts and outlet ducts with intermediate filter surfaces being formed in the filter body.

Such a filter body consists of a plurality of filter surfaces and has a high level of efficiency.

For the desired pressure regulation, i.e. the reduction of the velocity of the exhaust gases flowing into the exhaust gas filter and the increase in pressure in front of the filter body, the inlet duct is generally constructed as a diffuser. In the same way, to reduce the pressure and to increase the velocity of the exhaust gases, which have flowed through the filter body, the outlet duct is tapered in the shape of a funnel or nozzle respectively.

To ensure that the effect of the lateral lines is as good as possible, it is specified that the inlet apertures of the lateral lines are located in the region of the beginning of the diffuser and the outlet apertures are located in the region of the greater aperture width of the funnel-shaped outlet duct. The pressure and velocity can be selected as required by the appropriate selection of the positions of the apertures in the two ducts. For an optimal adaptation to the respective conditions, the aperture widths of the apertures into the lateral line can be adjusted. In a corresponding design of the adjustment appliances to regulate the aperture width, subsequent alterations can be made, if necessary, during operation.

An exemplified embodiment of the invention is described in principle below, by means of the drawings.

BRIEF DESCRIPTION OF THE DRAWINGS

FIG. 1 diagrammatically shows the exhaust gas filter specified by the invention in longitudinal section;

FIG. 2 shows a detailed enlargement of the structure within viewing circle "A" as shown in FIG. 1.

DESCRIPTION OF THE PREFERRED EMBODIMENT

The exhaust gas filter is fundamentally of a known construction, and therefore only the parts important for the invention are described in more detail below. This also applies, in particular, to the design of a filter body 1, which is disposed in a housing 2.

The exhaust gas filter has a supply line 3, which becomes wider in a funnel shape through a diffuser 4 in front of the filter body 1 until it has the diameter of the filter body 1. Behind the filter body 1, the outlet duct 5 tapers again in the shape of a funnel or nozzle. To the funnel-shaped outlet duct 5 there is attached an outlet 6.

Lateral lines 7, which begin in front of the filter body in the region of the transition between the supply line 3 and the diffuser 4 and end behind the filter body 1 in the region of the largest aperture width of the funnel-shaped outlet duct 5, are distributed around the filter body 1 over its periphery. In the region of the diffuser the lateral lines 7 extend on the outside along the diffuser wall. At both ends of the lateral lines 7 apertures 8 and 9 are provided, which produce the connection to the inlet side and the outlet side of the exhaust gases.

Instead of some or several lateral lines 7 distributed over the periphery of the filter body and of the diffuser 4, a circular or annular line may also be provided if required. In such a case the outer wall of the filter body 1 forms the inner wall of the circular line, while the outer wall of the circular line is formed by the housing wall 2. Only connecting pieces or ribs are then provided to position the filter body.

Of course the lateral lines 7 may also be simply disposed around the filter body or the housing surrounding it.

The mode of operation of the lateral lines 7 is described in more detail below.

In the unloaded condition there is a higher flow velocity and a lower pressure on the supply line side in front of the filter body because of the lower resistance in the filter body. There is a lower velocity and a higher pressure respectively on the outlet side in the funnel-shaped outlet duct in the region of the apertures 9. As long as there is a pressure $p_3$ in the region of the aperture 9 in the outlet duct 5, which is higher than a pressure $p_1$ in the region of the apertures 8 on the intake side, the exhaust gases already cleaned flow back through the lateral lines in the direction of the arrow. The part of the exhaust gas flow flowing back is therefore mixed again with the incoming flow of exhaust gas.

As the filter body becomes loaded further, a higher pressure builds up on the intake side in the diffuser 4 and in the supply line 3, as a result of which the difference in pressure between $p_3$ and $p_1$ becomes smaller and consequently so does the return flow velocity. As soon as $p_1 = p_3$ the return flow becomes zero.

If as a result the pressure $p_1$ in the region of the apertures 8 becomes greater than $p_3$ in the region of aperture 9 because of an even greater loading of the filter body with separated impurities, then a bypass flow occurs (see the broken arrows in FIG. 1). This means that a part of the uncleaned exhaust gas flows past the filter body 1 and at the outlet side is again added in the funnel-shaped outlet duct 5. By this design a too great build up of pressure $p_1$ on the intake side is avoided, with the outlet velocity through the funnel-shaped outlet duct 5 and the outlet 6 being simultaneously increased. In this way an equalisation of the gas pressure is achieved in the exhaust gas filter.

If required, the apertures 8 and/or 9 may be further adjusted with respect to their aperture widths by regulating appliances (not shown) and, if required, be subsequently altered.

As is evident, the gas pressure in front of and behind the filter body, and thus the separation efficiency in the filter body, can be regulated by the constructional design of the diffuser 4, of the funnel-shaped outlet duct 5, of the lateral lines 7, and of the inlet and outlet lines, with the high kinetic gas velocity in the diffuser 4 being converted into pressure energy according to the law of the conservation of energy.

I claim:

1. A fluid filter, suitable for filtering soot from the exhaust gas of a diesel engine, comprising in combination:

a.) a housing, an elongated filter body within said housing having a filter body inlet and, a filter body outlet end, and a filter body outer surface between said inlet and outlet ends, said housing having an inlet duct and an outlet duct with the housing;

b.) a fluid diffuser having an open inlet end and an outlet end terminating with said filter body inlet end;

c.) a fluid supply line terminating with said diffuser open inlet end;

d.) an outlet duct having an inlet and terminating with said filter body outlet end and having an outlet duct open end; and, e.) at least one elongated lateral fluid line extending along the filter body outer surface and spaced and sealed from said filter body, having a lateral line inlet and spaced from said filter body inlet end and communicating directly with said inlet duct for receiving fluid from said fluid supply line, and having a lateral line outlet end adjacent said filter body outlet end, and communicating with said outlet duct, said lateral line being constructed and arranged to pass fluid in either direction dependent upon pressure.

2. A fluid filter according to claim 1 wherein said lateral line inlet end is adjacent said fluid diffuser inlet end.

3. A fluid filter according to claim 1 wherein said lateral line outlet end is an aperture opening into said outlet duct inlet end.

4. A fluid filter according to claim 1 wherein said filter body is surrounded by said housing, said housing having an elongated wall, and said lateral line comprises a circular elongated line between the filter body outer surface and the housing wall.

* * * * *